Figure 1:
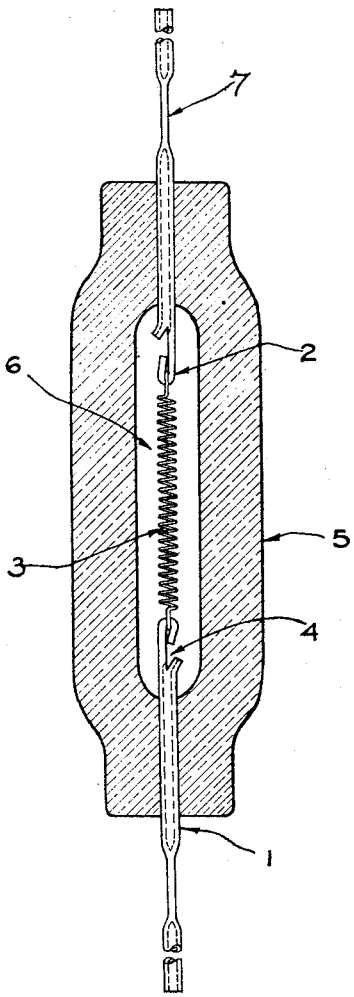

Nov. 2, 1937.　　　　H. SWANSON　　　2,097,679

ELECTRIC INCANDESCENT HIGH PRESSURE GAS LAMP

Filed Sept. 18, 1934

Witnesses:
Herman Hilston
N. William Mackey

Inventor
Harold Swanson

Patented Nov. 2, 1937

2,097,679

UNITED STATES PATENT OFFICE 2,097,679

ELECTRIC INCANDESCENT HIGH PRESSURE GAS LAMP

Harold Swanson, Cleveland, Ohio

Application September 18, 1934, Serial No. 744,598

6 Claims. (Cl. 176—16)

This invention relates to such improvements to increase the lighting efficiency of electric incandescent lamps and similar articles.

One object of this invention is to use small electric incandescent lamps, which have a relatively thick wall glass bulb with a small inside volume of short radii dimensions, into which high pressure gas is introduced and finally sealed by a means similar to that described in the invention of John S. Van Horne, Patent 1,644,002, patented Oct. 4, 1927 which uses hollow metal wires for exhausting, filling, and sealing the gas within such small electric incandescent lamps, being more fully described later herein.

A further object is that the hollow metal wires shall be especially used to admit the high pressure gas into the small electric incandescent lamps.

A further object is that when two (2) hollow metal wires are hermetically sealed into the wall of a small electric incandescent lamp, the flushing gases are permitted to pass in and out simultaneously; one hollow metal wire being the inlet passage, while the other hollow metal wire serves as the outlet passage.

A further object is that after a small electric incandescent lamp has been filled with high pressure gas, the hollow metal wires each shall be flattened mechanically to close its hollow center passage, and cut off to suitable lengths for electrical connections; thereby making a preliminary seal to seal the high pressure gas within the lamp, then an additional seal is made by electric welding, fusing or soldering the ends air tight to insure a more perfect final seal for the lamp.

A further object is that the high pressure gas permits the lamp filament to burn and glow at a higher temperature and incandescence than is possible within low pressure gas, without appreciably reducing the lamp filament's life, thereby increasing the lighting efficiency of such electric incandescent lamp.

A further object is that the small electric incandescent lamp bulb is made from a hard glass of high plastic and melting temperature, with relatively thick walls, small inside volume, and short radii dimensions; combined for a purpose which permits such lamp bulb to hold gas at extremely high pressure, without distorting its shape, and bursting, when the lamp filament is burned.

A further object is that in very low wattage extremely small electric incandescent lamps, gas pressures running up into thousands of pounds per square inch absolute pressure can be safely used.

A further object is to design a small electric incandescent lamp which is filled with high pressure gas that can be used singularly as a small individual lamp.

A further object is that the small electric incandescent lamp, which is filled with high pressure gas, can have solid lead-in wires for electrical connections to the lamp filament; in which case an additional hollow metal wire is necessary for exhausting, filling and finally seal the high pressure gas within such lamp.

A further object is that the small electric incandescent lamps which are filled with high pressure gas shall be used collectively within a large lamp bulb as a large general lighting lamp.

A further object is that the remaining space within the large lamp bulb, which incloses the small electric incandescent lamps, shall not be exhausted of air and may even be connected to the atmosphere.

A further object is that the remaining space within the large lamp bulb, which incloses the small electric incandescent lamps, can be exhausted to a practical vacuum.

A further object is that the remaining space within the large lamp bulb, which incloses the small electric incandescent lamps, can be filled with any gas but more particularly hydrogen gas to a pressure of approximately one (1) atmosphere absolute pressure; for a purpose which permits the heat to quickly dissipate from the outer surface of the small electric incandescent lamps.

A further object is that by using the hollow metal wire final seal with the small electric incandescent lamps, the glass bulb with that final seal can be fully annealed to relieve it of nearly all glass strains before sealing in the high pressure gas and no additional glass strains are made by the sealing operations.

A further object is that by using the hollow metal wire final seal with the small electric incandescent high pressure gas filled lamps, the final seal is made without heating any part of the glass bulb to the melting temperature of the glass.

A further object is that when a small electric incandescent high pressure gas filled lamp with a hollow metal wire final seal is used as a small individual lamp having a lamp base, the end of the hollow metal wire with the final seal can be located at such a point that the final seal is additionally sealed air tight by soldering or welding the end of the hollow metal wire to the lamp base for the electrical connection with such base.

Other objects of the invention will appear more fully hereinafter.

As the small electric incandescent lamp filament temperature rises, it heats the gas which surround it; this heat makes the gas pressure rise to still higher pressures until a maximum pressure is reached when the heat dissipated by the lamp filament is equal to the heat dissipated by the outer surface of such small electric incandescent lamp. This higher gas pressure permits the lamp filament to burn at higher temperatures without melting or sublimating such lamp filament. The higher the gas pressure, the higher the lamp filament temperature. The higher the lamp filament temperature, the greater the lighting efficiency of such electric incandescent lamp. The principal limiting factors of the maximum gas pressure safely used within such small electric incandescent lamp is governed by the melting and plastic temperature of the glass, the strength of the glass, and the dimensions of the glass bulb.

The high pressure gas which is used to fill the small electric incandescent lamp is preferably argon, nitrogen, hydrogen, or other gases; such gases have previously been used to fill low pressure gas electric incandescent lamps.

The filament within the small electric incandescent lamp is preferably made from tungsten, thoriated tungsten, tantalum, tantalum carbide, rhenium, osmium, carbon, or other substances. Such substances have previously been used for filaments in low pressure gas electric incandescent lamps.

The filament within the small electric incandescent lamp is preferably made into wire, rod, ribbon, its shape straight, bent, coiled, crimped, or other forms. Such forms have previously been used for filaments in low pressure gas electric incandescent lamps.

The reason for referring generally to small electric incandescent lamps and not all sizes of electric incandescent lamps in this specification, is that the small electrical incandescent lamps are more practical and safer to fill with high pressure gas than the large electric incandescent lamps; also the high wattage filaments within the large lamps radiate so much heat that in many lamps the heat cannot pass through their glass bulbs fast enough to prevent melting of the glass; however it is a further object of this invention to include all sizes of electric incandescent lamps, which can be manufactured with the improvements of this invention.

Whenever the words "high pressure gas" are herein referred to, they are intended to mean any gas which is used to fill electric incandescent lamps, where the filled gas pressure is any pressure from twenty-nine (29) pounds per square inch absolute pressure upward to the maximum safe working pressure of the small electric incandescent lamp bulb holding such gas, which pressure in extremely small electric incandescent lamp bulbs would be many thousand pounds per square inch absolute pressure.

Whenever the words "hollow metal wires" are herein referred to, they are intended to mean a hollow wire or tubing like wire that is similar to the metal tubing which is described in the invention of John S. Van Horne, Patent 1,644,002, patented Oct. 4, 1927.

One type of this hollow metal wire is made as follows: an alloy of approximately 45% nickel and 55% iron is manufactured into a thick wall tube or hollow wire and forms the alloy core part; this is then nickel-plated on its outer surface and is permitted to age for several weeks; after which a sheath of copper is plated on around it; then it is again mechanically worked down to a suitable size by drawing it through wire drawing dies; after which it is oxidized by chemical agents deposited around its outer surface and heated to an oxidizing temperature by passing it through a hot furnace, the usual chemical being sodium pyroborate in a saturated solution of water; any method which oxidizes the outer surface of the copper sheathe would be satisfactory. The nickel-iron alloy core part has approximately the same thermal coefficient of expansion as glass or platinum and the oxidized copper sheathe around it permits the hollow metal wire to be hermetically sealed through the glass wall of the bulb by fusing the glass around it.

Whenever the words "hermetically sealed" are herein referred to, they are intended to mean that the outer surface is hermetically sealed for a short distance completely encircling the wire.

Whenever the words "final seal" are herein referred to, they are intended to mean that final receptacle closure seal which seals the lamp's gas within the lamp bulb; or the external terminal seal formed by closing the center opening within the hollow metal wire air tight.

Figure 3:
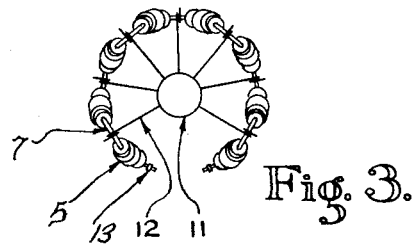
Figure 2:
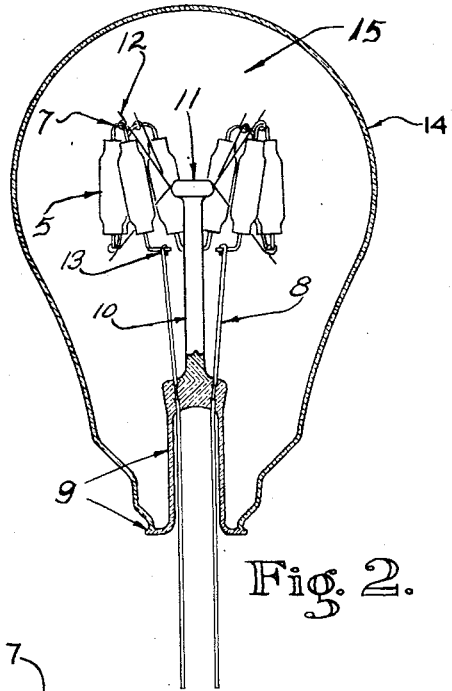

The invention is illustrated in the accompanying drawing, in which:

Fig. 1 is an enlarged sectional view of the small electric incandescent lamps. Fig. 2 shows a string of the same small electric incandescent lamps mounted within a large lamp bulb; Fig. 3 is the plan view mounting and Fig. 4 is the developed view mounting of the same.

Figure 4:
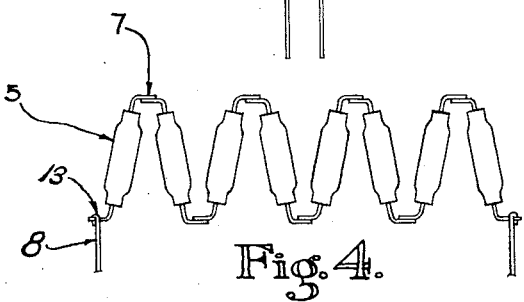

Referring to Fig. 1 which is an enlarged sectional view of a double-end small electric incandescent lamp; having two hollow metal wires 1, with hooks 2 formed on one end and clamped to the filament 3, openings are cut at 4 into the hollow center passage of such hollow metal wires 1 which are then hermetically sealed into the ends of the thick walled glass bulb 5 by glass fusion; after which the small inside volume 6 is exhausted and filled with high pressure gas through the hollow metal wires 1, which are then mechanically flattened at 7 to form the final seal, located at such a point that the ends will be additionally plugged by fusion when they are spot-welded together as shown at 7 in Fig. 4.

Referring to Fig. 2 a sectional view, Fig. 3 a plan view, and Fig. 4 a developed view, which all illustrate the large general lighting lamp mounting of the small electric incandescent lamps. Two common solid type 3-piece lead-in wires 8 are hermetically sealed into the glass flare stem press 9 near the glass stem rod 10 by glass fusion. The stem button 11 is formed for the spider support wires 12, into which are mounted a string of small high pressure gas filled electric incandescent lamps 5 all spot-welded together in multiple series at 7; both ends of the string of lamps 5 are clamped into the hooks 13 in the ends of the 3-piece lead-in wires 8. The glass bulb 14 is then sealed to the glass flare 9. The space 15 inside of the large lamp bulb 14 can be left sealed with atmospheric air, exhausted to a practical vacuum, or filled with any other gas to approximately one (1) atmosphere absolute pressure (approximately 14.7 pounds per square inch absolute pressure). The small electric incandescent lamps can also be connected in parallel or in series parallel within the large lamp bulb for various voltage and wattage designs that may be required for the large lamp.

It is obvious that the miniature low wattage lamps are adapted more readily to the improvements of this invention than the large high wattage lamps. Therefore it is evident that a large variety of such miniature low wattage lamps can be built with the improvements of this invention and in anticipation of the manufacture of such lamps, it is a further object of this invention not to limit the improvements of this invention only to the electric incandescent lamp herein shown and described, but I desire to claim any electric incandescent lamp that uses any of the improvements of this invention.

I claim:

1. In an electric incandescent lamp, the combination of several small electric incandescent lamps filled with high pressure gas, such small electric incandescent lamps being connected electrically in series, a lamp stem with embedded electric lead-in wires, and embedded support wires for such small electric incandescent lamps, a large lamp bulb sealed to such lamp stem and inclosing such small electric incandescent lamps, the remaining space within such large lamp bulb being air at approximately atmospheric pressure.

2. The combination, with an electric incandescent lamp having high pressure gas sealed within a thick wall glass bulb, of a hollow metal wire hermetically sealed through the wall of said bulb, said hollow metal wire being a passage for said high pressure gas, said hollow metal wire being closed air tight to enclose said high pressure gas within said bulb.

3. In an electric incandescent lamp, the combination of a lamp bulb made from glass, said bulb having relatively thick walls, said bulb having relatively a small inside volume, said bulb having relatively short inside radii dimensions, two hollow metal wires hermetically sealed through the wall of said bulb, said hollow metal wires being flow conduits for said lamp bulb, high pressure gas being enclosed within said lamp bulb, said hollow metal wires being electric lead-in wires for the lamp filament, a lamp filament connected to aforesaid lead-in wires, said hollow metal wires being closed air tight to finally seal said lamp bulb.

4. The combination, with an electric lamp, of a thick wall glass bulb, a hollow metal wire tubulation hermetically sealed through the wall of said bulb, high pressure gas being a filling for said bulb, a final seal being an external terminal seal formed in said hollow metal wire, said hollow metal wire being a fluid pressure filling tube, said hollow metal wire being closed air tight to enclose said high pressure gas within said bulb.

5. A combination hook conductor final seal tubulation, for an electric lamp, consisting of a hollow metal wire hermetically sealed through the wall of said lamp, said hollow metal wire having a flattened portion on inside end, said flattened portion being formed into a hook, an opening in said hollow metal wire being near said hook, said hollow metal wire being an electrical conductor, said hollow metal wire being a fluid conduit, said opening being a fluid conduit orifice, a final seal being said hollow metal wire closed air tight, said final seal being near external end of said hollow metal wire.

6. In an electric incandescent filament lamp, the method of making a high pressure gas filled lamp, comprising, making a thick wall pressure restraint glass bulb, making electric leads of two hollow metal wires having fluid pressure openings, making an electric incandescent lamp filament, securing said filament to said hollow metal wires, hermetically sealing said hollow metal wires through the wall of said bulb with said openings and said filament within said bulb, exhausting the air from the interior of said bulb through one of said hollow metal wires while simultaneously introducing a predetermined high pressure gas through other of said hollow metal wires, closing the hollow metal wires near the external ends air tight to retain said high pressure gas within said bulb.

HAROLD SWANSON.